E. H. O'BRIEN
HEATING APPLIANCE FOR CARBURETERS.
APPLICATION FILED JAN. 4, 1919.
1,308,860. Patented July 8, 1919.
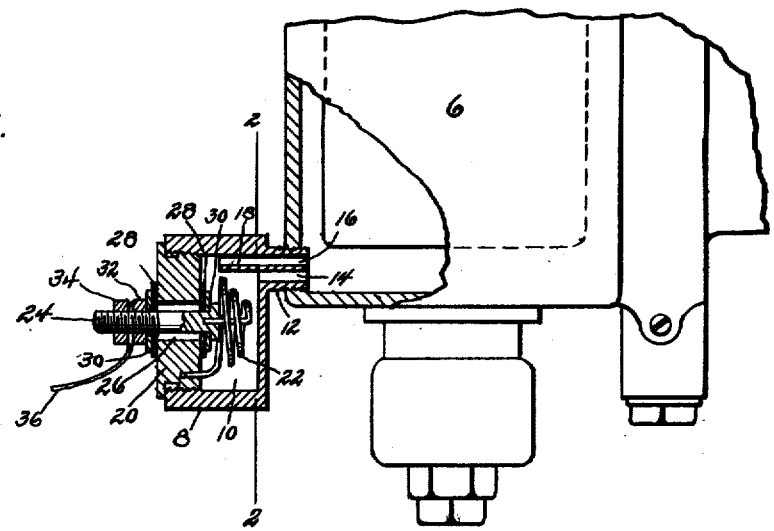
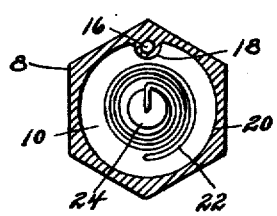
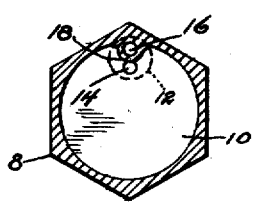
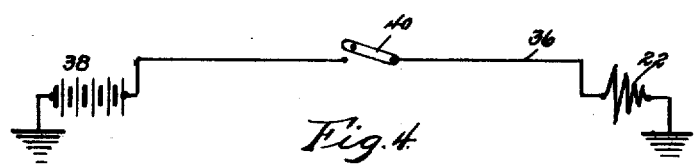
WITNESS:
INVENTOR.
Edmund H. O'Brien,
BY
ATTORNEY

UNITED STATES PATENT OFFICE.

EDMUND H. O'BRIEN, OF KANSAS CITY, MISSOURI.

HEATING APPLIANCE FOR CARBURETERS.

1,308,860. Specification of Letters Patent. Patented July 8, 1919.

Application filed January 4, 1919. Serial No. 269,554.

*To all whom it may concern:*

Be it known that I, EDMUND H. O'BRIEN, a citizen of the United States, residing at Kansas City, in the county of Jackson, State of Missouri, have invented certain new and useful Improvements in Heating Appliances for Carbureters, of which the following is a full and exact specification.

The present invention relates to improvements in carbureters and aims to provide a novel form of attachment adapted to be applied to the bowl of any of the common types of carbureters for the purpose of initially heating the liquid fuel contained in the carbureter bowl.

To this end I have devised a self-contained heating attachment provided with a heating chamber containing a suitable heating element, the device being adapted to be conveniently attached to the carbureter bowl and thus form a separate heating compartment communicating with said bowl.

It is also sought to provide a neat and inexpensive device of the character described, comprising a simple construction of few parts but operating efficiently to perform the desired function.

With this general object in view the invention will now be described with reference to the accompanying drawing illustrating one form of construction which has been devised for embodying the proposed improvement, after which the novel features therein will be set forth in the appended claim.

In the drawing—

Figure 1 is a front elevation showing a portion of a carbureter partly broken away and having attached thereto a heating device constructed in accordance with the present invention, said device being represented in central vertical section;

Figs. 2 and 3 are sectional views taken on the line 2—2 of Fig. 1 and looking in opposite directions; and Fig. 4 is a wiring diagram showing the electric circuit for the heating element.

Referring now to the drawing in detail, this illustrates the attachment as applied to the bowl 6 of a carbureter which may be of any ordinary or preferred type, this bowl forming the float chamber of the carbureter. The attachment comprises a body portion 8 which forms a heating chamber 10, one side of the attachment being provided with a stem 12 which is threaded to fit a threaded opening of the same size which is drilled into the bowl 6 on approximately a level with the bottom of the float chamber, as illustrated in Fig. 1. The stem 10 is provided with an inlet passage 14 for permitting flow of the liquid from the carbureter into the heating chamber 10, and also with an outlet passage 16 which is continued on through an internal rib 18 over to the vicinity of the opposite side of the heating chamber so as to separate somewhat the inlet and outlet currents and thus facilitate the circulation through the attachment. The outer side of the heating chamber is formed by a disk or cap 20 threaded into the body portion 8 and carrying an electric resistance or heating coil 22 disposed within the chamber 10. One end of the coil 22 is embedded in the disk or cap 20, and its other end is secured to the inner or headed end of a bolt 24 extending through an enlarged opening 26 in the cap 20 and insulated therefrom by means of suitable mica or fabric washers 28 held in place by metal washers 30, a nut 32 on the outer threaded portion of the bolt coöperating with its inner headed end to secure the parts in this relation. A second nut 34 serves to clamp a wire 36 to the bolt 24 for conducting current from a battery 38, the current being controlled by means of a suitable switch element 40 of any desired type. Fig. 4 of the drawing shows the circuit thus established, the coil 22 being grounded by its connection with the disk or cap 20.

It is thus apparent that a simple and efficient form of attachment is provided for initially heating the liquid fuel of the carbureter with a view to quickening the vaporizing action of the fuel and hence enabling the motor (to which the carbureter is attached) to be started more readily, a result which is especially desirable in cold weather when the vaporizing action is slow in starting. By closing the switch 40 temporarily, the circuit is closed through the heating coil 20, the fuel in the chamber 10 is quickly heated and the flow of the fuel through said chamber is facilitated by the separate inlet and outlet passages 14 and 16 leading to the opposite sides of the chamber 10. A more complete and thorough circulation is also assured by having said inlet and outlet passages at the top of the chamber 10 since the unheated fuel will descend on entering the chamber and thereafter be obliged to rise to the top in order to escape by way of the passage 16. The device comprises a simple construction of few parts, and necessitates no change in the carbureter construction outside the mere drilling of the hole necessary for securing the stem 12. Furthermore, the improved construction provides an entirely self-contained attachment in which the heating chamber is maintained outside the carbureter bowl and no heating elements are introduced into the carbureter bowl, which has been found objectionable on account of the difficulty of assembling such parts in the bowl without interference with the action of the float member.

While the foregoing represents what is now regarded as the preferred form of embodiment of the improvement, I desire to reserve the right to make such formal changes or modifications as may fairly fall within the scope of the following claim.

What I claim is:

A heating attachment for carbureters comprising a device forming a heating chamber separate from the carbureter and having a stem portion at the top of said chamber for attachment to the carbureter, said stem portion having separate inlet and outlet passages therethrough arranged one above the other and providing communication between said carbureter and the top of said heating chamber, the inlet opening into said chamber being at one side thereof and the outlet opening at the opposite side thereof, and an electric heating element disposed in said heating chamber.

In witness whereof I affix my signature.

EDMUND H. O'BRIEN.

Copies of this patent may be obtained for five cents each, by addressing the "Commissioner of Patents, Washington, D. C."